(12) United States Patent
Hecht et al.

(10) Patent No.: US 9,964,234 B2
(45) Date of Patent: May 8, 2018

(54) MAGNETIC HOLSTER FOR HAND HELD BEVERAGE DISPENSERS

(71) Applicant: Automatic Bar Controls, Inc., Vacaville, CA (US)

(72) Inventors: Thomas R. Hecht, Winters, CA (US); Richard A. Martindale, Vacaville, CA (US); Bret D. Baker, Vacaville, CA (US)

(73) Assignee: Automatic Bar Controls, Inc., Vacaville, CA (US)

( * ) Notice: Subject to any disclaimer, the term of this patent is extended or adjusted under 35 U.S.C. 154(b) by 0 days. days.

(21) Appl. No.: 14/795,874

(22) Filed: Jul. 9, 2015

(65) Prior Publication Data
US 2016/0010763 A1    Jan. 14, 2016

Related U.S. Application Data

(60) Provisional application No. 62/022,549, filed on Jul. 9, 2014.

(51) Int. Cl.
| | |
|---|---|
| *F16L 3/00* | (2006.01) |
| *B67D 1/06* | (2006.01) |
| *F16B 1/00* | (2006.01) |
| *B67D 1/00* | (2006.01) |

(52) U.S. Cl.
CPC .............. *F16L 3/003* (2013.01); *B67D 1/06* (2013.01); *B67D 1/0084* (2013.01); *B67D 1/0086* (2013.01); *B67D 2210/00144* (2013.01); *F16B 2001/0035* (2013.01)

(58) Field of Classification Search
CPC ...... B67D 1/0084; B67D 1/0086; B67D 1/06; B67D 2210/00144; F16B 2001/0035; F16L 3/003
See application file for complete search history.

(56) References Cited

U.S. PATENT DOCUMENTS

| 5,344,074 A * | 9/1994 | Spriggs | B01F 5/0403 137/614 |
|---|---|---|---|
| 8,240,512 B2 * | 8/2012 | Sunatori | B65D 51/242 206/818 |
| 8,448,821 B2 * | 5/2013 | Hecht | B67D 1/0084 222/108 |
| 2009/0277927 A1 * | 11/2009 | Schroeder | B67D 1/0084 222/108 |
| 2011/0220159 A1 * | 9/2011 | Ellickson | B05B 15/0275 134/198 |
| 2011/0286883 A1 * | 11/2011 | Hecht | A23L 3/28 422/24 |

(Continued)

*Primary Examiner* — Paul R Durand
*Assistant Examiner* — Bob Zadeh
(74) *Attorney, Agent, or Firm* — Kilpatrick Townsend & Stockton LLP

(57) ABSTRACT

A holster for mounting a bar gun to a surface, the bar gun having a nozzle and a handle magnet. The holster has an elongated mounting plate having a top side, bottom side, first end and second end, and an aperture located between the first end and second end where the aperture penetrates the mounting plate from the top side to the bottom side and is configured to receive the nozzle of the bar gun. A holster magnet is fixed to the mounting plate adjacent the aperture between the aperture and the second end.

24 Claims, 6 Drawing Sheets

(56) References Cited

U.S. PATENT DOCUMENTS

2016/0009538 A1* 1/2016 Hecht .................. G05G 5/04
                                                      74/523
2016/0010763 A1* 1/2016 Hecht .................. F16L 3/003
                                                      222/180
2016/0176696 A1* 6/2016 Hecht ................ B67D 1/0888
                                                      222/144.5

* cited by examiner

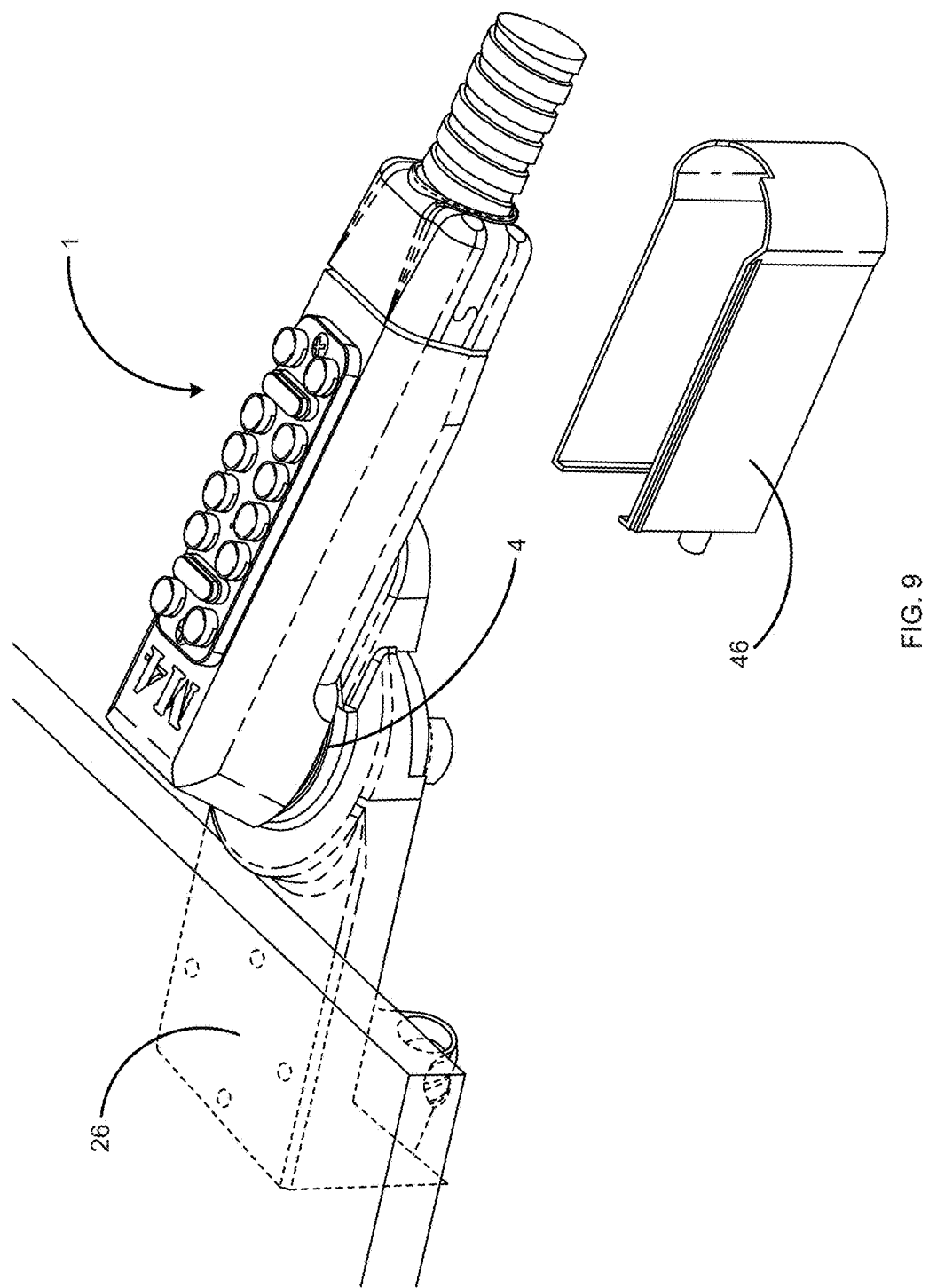

MAGNETIC HOLSTER FOR HAND HELD BEVERAGE DISPENSERS

CROSS-REFERENCES TO RELATED APPLICATIONS

This application claims the benefit of U.S. Provisional Application No. 62/022,549, filed on Jul. 9, 2014, which is incorporated by reference herein.

BACKGROUND OF THE INVENTION

The present invention relates to beverage dispensers. More specifically, the present invention relates to a holster for a beverage dispenser handle that secures the handle to the holster using magnetism when the handle is placed in the holster. In some embodiments, the present invention can include a detachable drip cup that is removable from the holster while the holster is installed to a surface and while the handle is stowed in the holster.

A number of beverage dispenser designs are well known in the art. These include carbonated beverage dispensers, non-carbonated beverage dispensers, beverage brewing systems, and liquor distribution systems. Many beverage dispenser designs have separate nozzles to pour (dispense) different beverages. Some beverage dispensers are capable of dispensing a variety of beverages out of a single nozzle. Beverage dispensing systems are commonly used in a wide variety of locales, including restaurants, snack bars, convenience stores, movie theaters, and any business where beverages are served.

Some beverage dispensing systems are in the form of a hand held beverage dispensing handle, or bar gun. The bar gun uses a single nozzle for dispensing multiple different beverages depending on the needs of the end user. Buttons are used to activate valves inside the bar gun to control the flow of a beverage from the beverage system. The buttons and valves are located on the top side of the bar gun for ease of use when dispensing a beverage. Users of bar guns often dispense a beverage when working in establishments such as the ones listed above, and also have many other tasks including, cleaning, organizing, stocking and being a cashier, among other tasks. When performing these tasks, it is often necessary to stow the bar gun when not in use.

Bar gun holsters are commercially available from various supplies including the assignee herein Automatic Bar Controls and at wunderbar.com. Some operators remark that with currently available known bar gun holsters, the bar gun can become dislodged from the holster falling into the operator's way, into other surfaces near the bar gun, or sometimes, even onto the floor. Some operators also remark that the nozzle can shift in its holster potentially causing the nozzle of the bar gun to become contaminated.

Some methods have been developed by the assignee herein to better retain the bar gun and sanitize the bar gun nozzle in the circumstance that the bar gun becomes contaminated, whether by coming into contact with contaminated surfaces of the holster or otherwise. Two examples are Assignee's U.S. Pat. No. 8,448,821 and Assignee's U.S. patent application Ser. No. 13/112,969, each of which is incorporated herein in their entirety by reference. While these bar gun holsters address the sanitization issues, the bar guns may still become dislodged from the holster if accidentally bumped by an operator or other object.

Some bar gun holsters have drip cups for containing and draining excess beverage that drips from the nozzle. Some operators have noted maintaining the drip cup can difficult because the entire holster must be uninstalled from the surface that it is installed to, in order to clean or maintain the drip cup.

Accordingly, it is desirable to develop a bar gun holster that can restrain the bar gun, so that it is less susceptible to becoming dislodged from the holster, with a drip cup that can be easily maintained and cleaned.

BRIEF SUMMARY OF THE INVENTION

In some embodiments, a holster for mounting a bar gun to a surface, where the bar gun has a nozzle and a handle magnet, has an elongated mounting plate with a top side, bottom side, first end and second end, and an aperture located between the first end and second end where the aperture penetrates the mounting plate from the top side to the bottom side and is configured to receive the nozzle of the bar gun. A holster magnet is fixed to the mounting plate adjacent the aperture between the aperture and the second end.

In some embodiments, the holster magnet is fixed to the mounting plate to coordinate with the handle magnet of the bar gun to secure the bar gun to the holster when the bar gun is placed in the holster. In some embodiments, the holster magnet is fixed to the bottom side of the mounting plate. The holster can further comprise aperture sidewalls extending downward from and encircling the aperture.

In some embodiments the first end of the mounting plate is configured to mount to the bottom side of a table. The holster can have at least one mounting hole located between the aperture and the first end for mounting the holster to a surface. In some embodiments the holster can have a bend between the first end and the aperture such the second end angles downward when the holster is mounted to the underside of a surface.

In some embodiments a holster and bar gun assembly for mounting a bar gun to a surface has a bar gun, having a handle with a top and bottom side, a nozzle extending from the bottom side of the handle, and a handle magnet disposed to the bottom side of the handle. In some embodiments, the assembly may have a holster, having an elongated mounting plate having a top side, bottom side, first end and second end. The mounting plate can have an aperture located between the first end and second end, where the aperture penetrates the mounting plate from the top side to the bottom side and is configured to receive the nozzle of the bar gun. In some embodiments, the holster magnet is fixed to the mounting plate adjacent the aperture between the aperture and the second end.

In some embodiments, the holster magnet is fixed to the mounting plate to coordinate with the handle magnet of the bar gun to secure the bar gun to the holster when the bar gun is placed in the holster. In some embodiments, the assembly can also have a handle magnet retaining plate for fixing the handle magnet to the bar gun handle. In some aspects, the holster magnet may be fixed to the bottom side of the mounting plate.

In some embodiments the assembly can also have aperture sidewalls extending downward from and encircling the aperture. In some aspects the first end of the mounting plate is configured to mount to the bottom side of a table. The assembly may also have at least one mounting hole located between the aperture and the first end for mounting the holster to a surface. In some embodiments the mounting plate may have a bend between the first end and the aperture such the second end angles downward when the holster is mounted to the underside of a surface.

In other aspects the present invention may include a holster for mounting a bar gun to a surface, with the bar gun having a nozzle and a handle where the holster has an elongated mounting plate having a top side, bottom side, first end and second end. The holster also has an aperture located between the first end and second end the aperture penetrating the mounting plate from the top side to the bottom side and is configured to receive the nozzle of the bar gun. A holster magnet is fixed to the mounting plate adjacent the aperture between the aperture and the second end. The holster may additionally include a drip cup detachably connected to the bottom of the mounting plate and surrounding the aperture wherein the drip cup is detachable from the mounting plate when the mounting plate is installed to the surface and the bar gun is stowed in the holster.

In some embodiments the holster magnet is fixed to the mounting plate to coordinate with the handle magnet of the bar gun to secure the bar gun to the holster when the bar gun is placed in the holster. In some aspects the holster magnet is fixed to the bottom side of the mounting plate. In many embodiments the drip cup comprises a bottom, two side walls, a front wall, a back wall and a drain outlet penetrating the back wall. The drip cup may further comprise a drain nipple extending outward from the back wall drain outlet. In some aspects the mounting plate further comprises a downward extending wall having a drain port.

In many embodiments the drain nipple is configured to coordinate with part of the mounting plate to align and restrain the drip cup to the mounting plate. In many embodiments, the holster may have at least one mounting hole located between the aperture and the first end for mounting the holster to a surface. In some aspects, the first end of the mounting plate is configured to mount to the bottom side of a table.

For a further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

BRIEF DESCRIPTION OF THE DRAWINGS

FIG. 9 shows the bar gun holster with the drip cup and the bar gun of FIG. 5 mounted to the underside of a table with the detachable drip cup removed while the bar gun is stowed in the holster.

DETAILED DESCRIPTION OF THE INVENTION

The holster also can contain a drip cup with a drainage outlet for draining excess beverage that drips from the bar gun nozzle away from the holster. The drip cup is configured to be detachable from the holster even when the bar gun is installed in the holster and when the holster is still installed to a surface.

Figure 1:
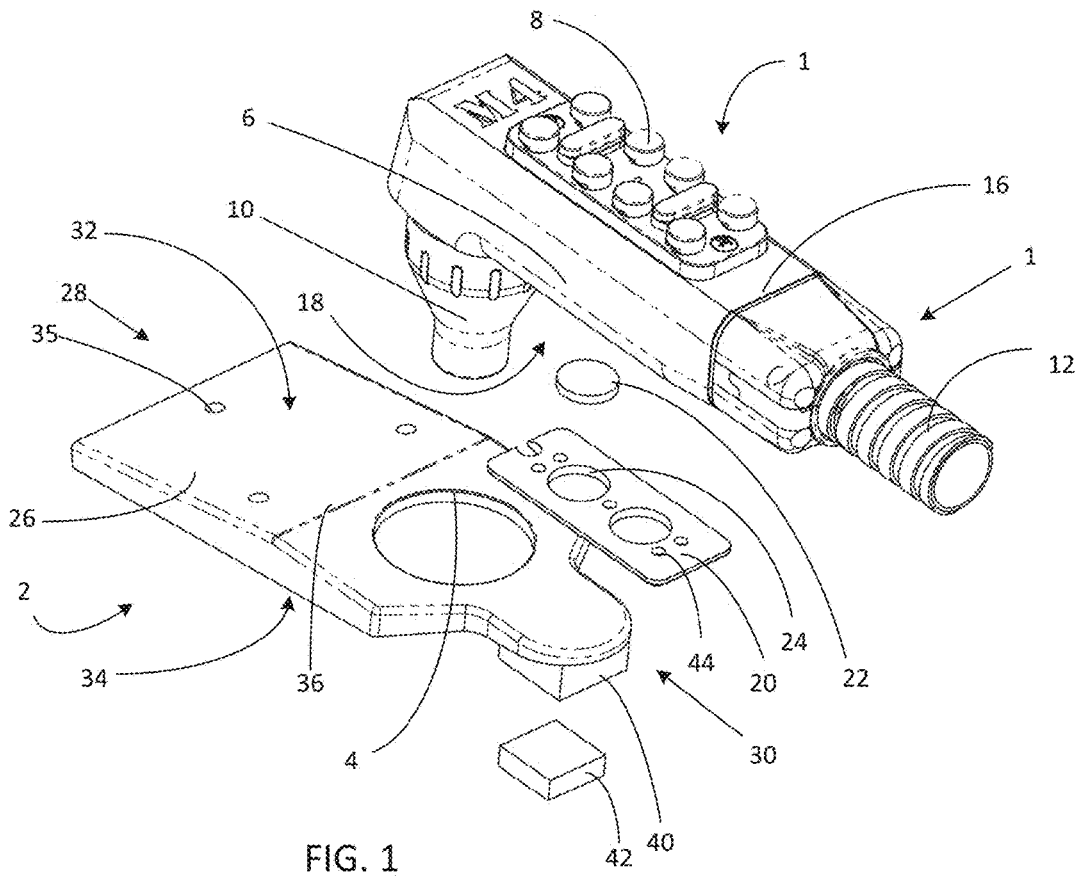
FIG. 1 shows a top perspective exploded view of a bar gun holster and bar gun in accordance with many embodiments of the present invention.
Figure 2:
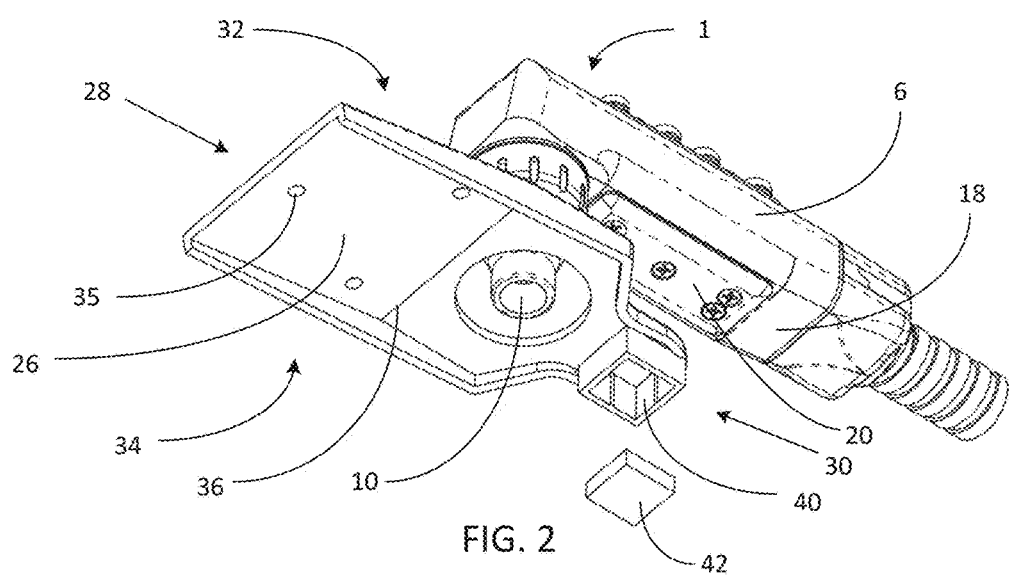
FIG. 2 shows a bottom exploded perspective view of the bar gun holster and bar gun of FIG. 1.

FIGS. 1 and 2 show top and bottom perspective views of a bar gun holster 2 and bar gun 1 in accordance with one embodiment of the present invention. The bar gun 1 has a handle 6 with buttons 8 on its top side 16 and a nozzle 10 for dispensing a beverage. The handle 6 and buttons 8 are configured so an operator can hold the bar gun 1 in their hand and press one of the buttons 8 to selectively dispense a particular beverage, depending on the desire of the operator. Beverages are fed into the bar gun 1 by beverage fluid lines (not shown) encased in a flexible tubing 12 that extends off of the back end of the bar gun 1. A handle magnet retaining plate 20 is disposed to the bar gun 1 to the handle bottom side 18 of the bar gun 1. A handle magnet 22 is disposed into a recess 24 that encases the handle magnet 22 in the handle magnet retaining plate 20 and the handle magnet retaining plate 20 is fastened to the bar gun handle 6 using fasteners in mounting holes 44. In the manner shown, the handle magnet 22 is fixed to the magnet retaining plate 20 by press-fit or glue, but other ways for fixing the handle magnet 22 to the handle retaining plate 20 are possible. Similarly, the handle magnet 22 can be mounted to the handle 6 using various methods other than the retaining plate 20 disclosed such as being directly fixed to the bar gun handle 6 itself without the retaining plate 20.

The holster mounting plate 26 has a first end 28, a second end 30, a top side 32 and a bottom side 34. The first end 28 has mounting holes 35 for installing the mounting plate 26 to a surface. The mounting plate 26 shown in this embodiment is configured to be mounted to the underside of a table or countertop. Screws, fasteners or other means for mounting the mounting plate 26 to the surface can all be utilized. Between the first end 28 and the second end 30 aperture 4 penetrates the mounting plate 26 for accepting the nozzle 10 of the bar gun 1. The aperture 4 is sized and configured so the nozzle 10 can fit into the aperture 4 and the handle 6 of the bar gun 1 is able to rest on the top side 32 of the mounting plate 26 adjacent to the aperture 4 and over the second end 30 of the mounting plate 26. In this embodiment, mounting plate 26 has a slight bend 36 between the aperture 4 and the first end 28. This is so the mounting plate 26 can be installed to the underside of a table and the second end 30 portion of the mounting plate 26 will then angle downward for easier accessibility when stowing and removing the bar gun 1 from the holster 2 during use.

The second end 30 of the mounting plate 26, in this embodiment, is narrower than the first end 28. On the underside of the mounting plate on the second end a magnet retainer 40, in the shape of a box in this embodiment, is shown. The mounting plate magnet 42 is installed up into the mounting plate magnet retainer 40 and held in place by press fit, glue or other similar means for fixing the magnet 42 into the mounting plate magnet retainer 40.

When in use the mounting plate magnet 42, fixed to the bottom side 32 of the mounting plate 26 aligns with the bar gun handle magnet 22 on the bar gun handle 6 and the attraction force between the magnets provides additional restraint for keeping the bar gun 1 secured in the holster 2.

Figure 3:
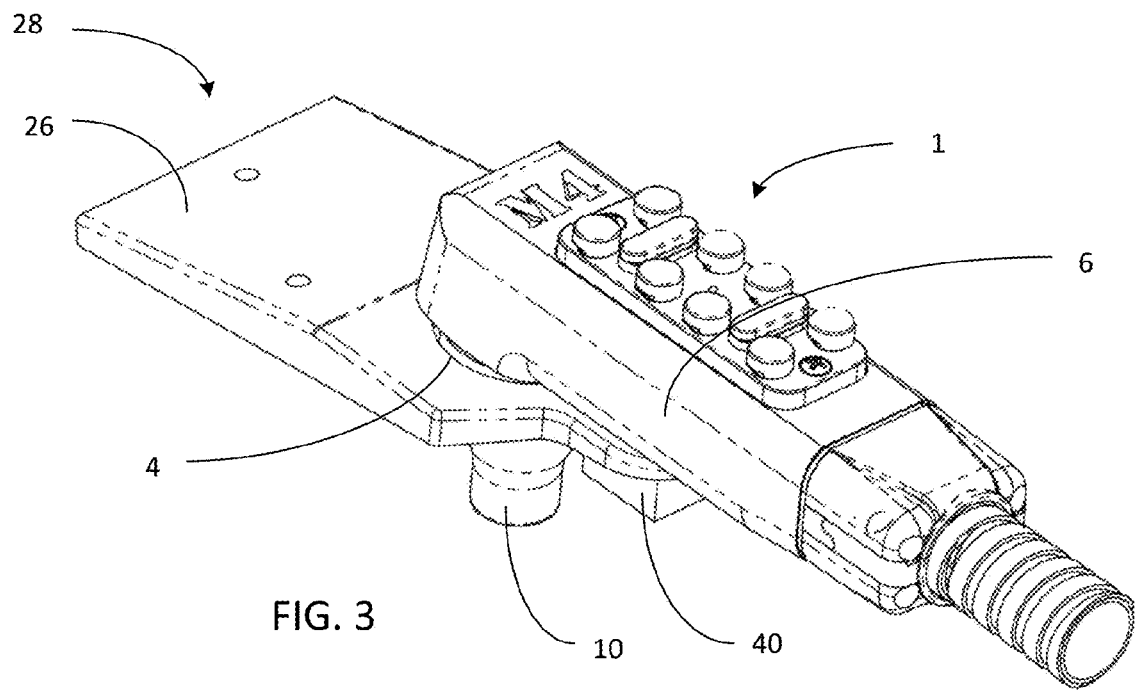
FIG. 3 shows a top assembled perspective view of the bar gun holster and bar gun of FIG. 1.
Figure 4:
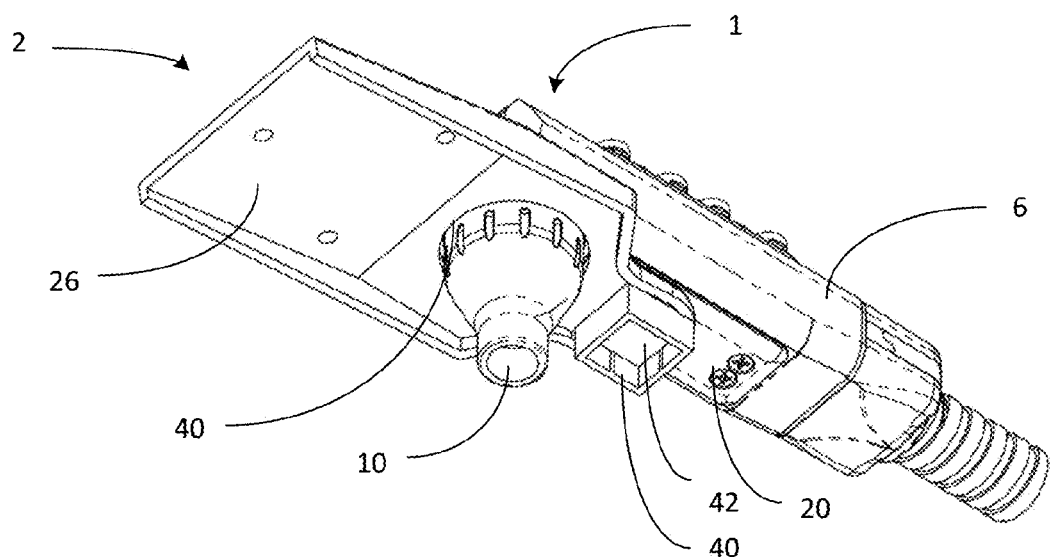
FIG. 4 shows a bottom assembled perspective view of the bar gun holster and bar gun of FIG. 1.
Figure 5:
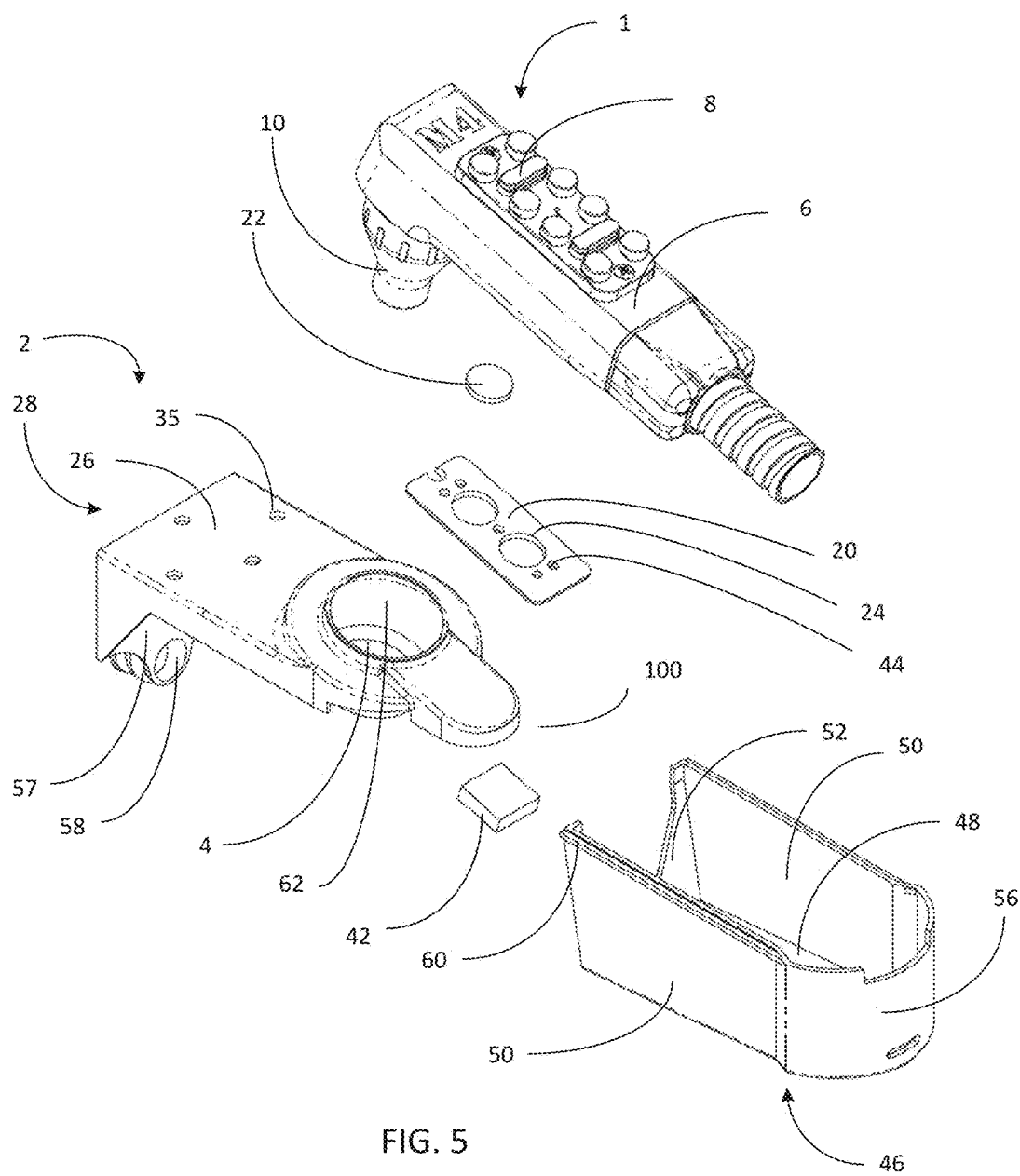
FIG. 5 shows an exploded top perspective view of a bar gun holster with a detachable drip cup and bar gun in accordance with the present invention.
Figure 6:
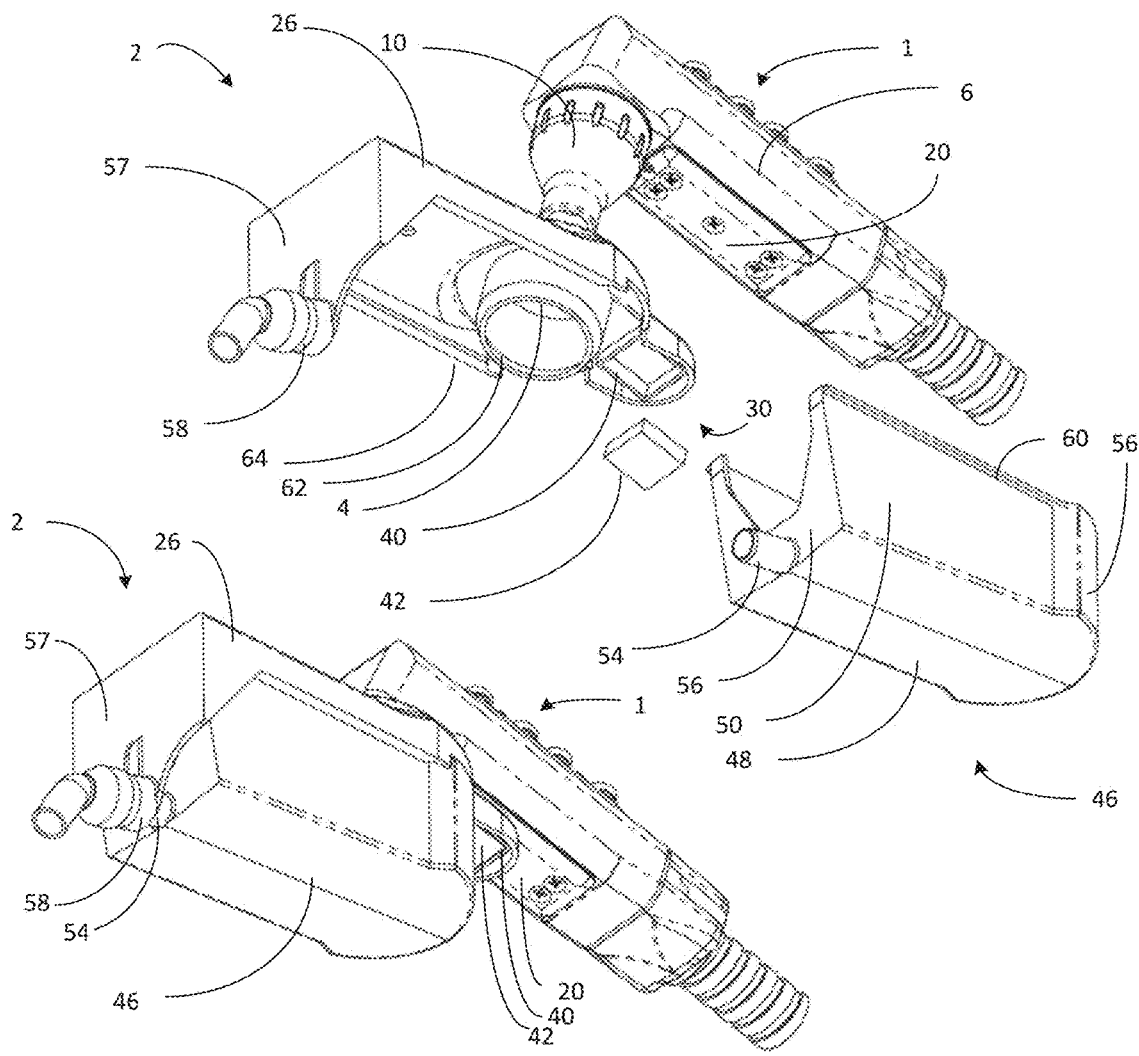
FIG. 6 shows an exploded bottom perspective view of the bar gun holster with the detachable drip cup and the bar gun of FIG. 5.
Figure 7:
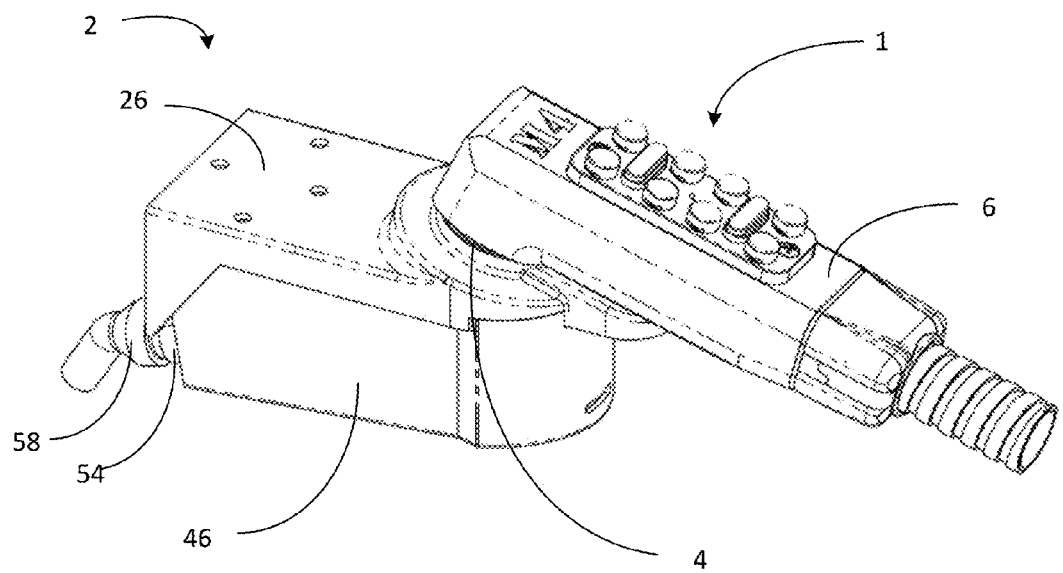
FIG. 7 shows an assembled top perspective view of the bar gun holster with the detachable drip cup and the bar gun of FIG. 5.
Figure 8:
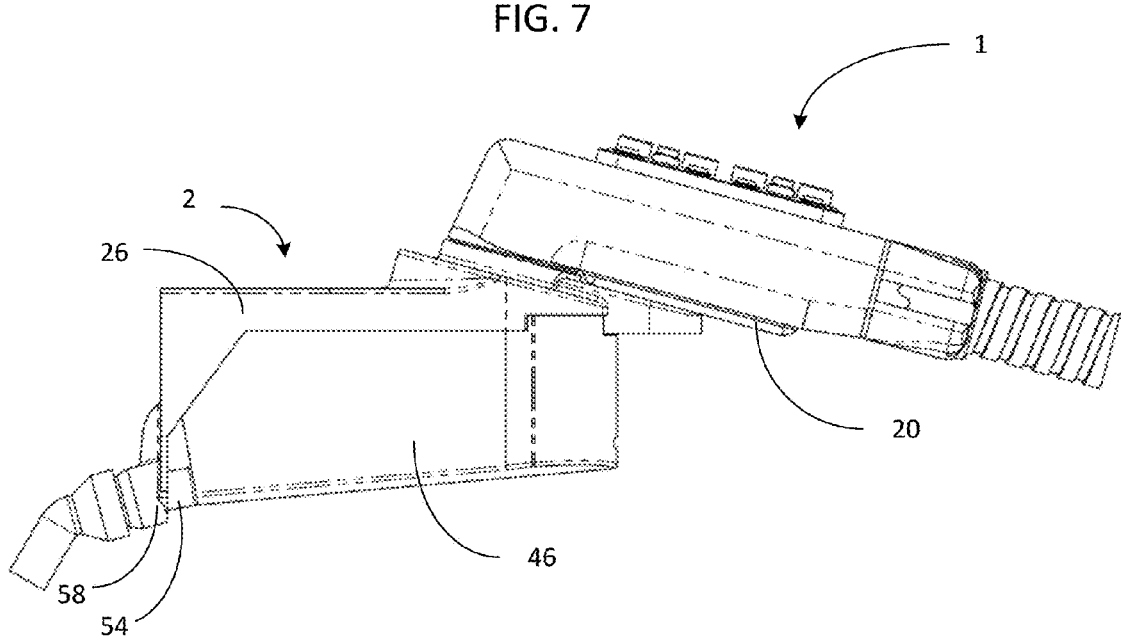
FIG. 8 shows an assembled side view of the bar gun holster with the detachable drip cup and the bar gun of FIG. 5.

FIGS. 3 and 4 illustrate the bar gun holster 2 and bar gun 1 shown in a top and bottom perspective view assembled together when the bar gun 1 is fully stowed in the bar gun holster 2. The mounting plate magnet 22 on the underside of the mounting plate 26 can be seen in the magnet retainer 40 and aligned with the handle 6 of the bar gun 1. The handle magnet 22 cannot be seen as it is located behind the bar gun handle magnet retainer 20, which is shown fastened to the underside of the bar gun handle 6 in these figures.

The nozzle 10 of the bar gun 1 penetrates through the aperture 4 of the mounting plate 26. There is clearance between the first end 28 of the mounting plate 26 and the nozzle end of the bar gun 1 to allow for installing the mounting plate 26 to the underside of a surface. While this embodiment is configured to be installed to the underside of a table or countertop, one skilled in the art will appreciate that other mounting arrangements are possible including mounting the holster to a wall or to the side of a table. In the manner where the holster 2 is mounted to the side of a wall or table, the magnets provide the necessary additional restraint to the holster 2 for restraining the bar gun 1 in the holster 2.

FIGS. 5-9 illustrate an alternative embodiment of a bar gun holster 2 and bar gun 1 in accordance with the present invention. This embodiment is similar to the previously described and illustrated embodiment in that the bar gun 1 has a handle 6 with buttons 8 on its top side and a nozzle 10 for dispensing a beverage. On the underside of the bar gun 1 on the handle 6, a magnet retaining plate 20 is installed to the bar gun 1 for fixing the handle magnet 22 to the bar gun 1.

The mounting plate 26 has a first end 28, a second end 30, a top side 32 and a bottom side 34. The first end 28 has mounting holes 35 for installing the mounting plate 26 to a surface. Between the first end 28 and the second end 30 an aperture 4 penetrates the mounting plate 26 for accepting the nozzle 10 of a bar gun 1. The aperture 4 is sized and configured so the nozzle 10 can fit into the aperture 4 and the handle 6 of the bar gun 1 is able to rest on the top side of the mounting plate 26 adjacent to the aperture 4 and over the second end 30 of the mounting plate 26. An aperture sidewall 62 extends downward from the aperture 4 forming a cylindrical sleeve that aids in retaining the bar gun 1 in the holster 2.

The second end 30 of the mounting plate 26 here is narrower than the first end 28. A mounting plate magnet retainer 40 is shown on the underside of the mounting plate 26 on the second end 30, in the shape of a box in this particular embodiment. Other shapes, including circles, are also conceivable. The magnet 42 is installed up into the magnet retainer 40 and held in place by press fit, glue or other similar means for fixing the magnet 42 into the magnet retainer 40.

When in use the mounting plate magnet 42 aligns with the bar gun handle magnet 22 and the attraction force between the magnets provide additional restraint for keeping the bar gun 1 secured in the holster 2.

This embodiment also has a detachable drip cup 46 that attaches to the bottom side of the mounting plate 26. The drip cup 46 is configured to have a bottom 48 and side walls 50 that extend up from the bottom 48 as well as along the bottom 48 of the drip cup 46. There is a back wall 52 with a drain outlet 54 and a front wall 56 that is curved to partially encircle the aperture 4 of the mounting plate 26 when the drip cup 46 is installed on the holster 2. The back wall 52 only partially extends up from the bottom 48 of the drip cup 46 to allow for coordination with a downward extending mounting plate wall 57 that has a drain access port 58. The opening in the back wall 52 provides clearance for the nozzle 10 so that the drip cup 46 can be removed while the bar gun 1 is stowed in the mounting plate aperture 4. The drain outlet 54 of the drip cup 46 has a nipple shape and extends from the back wall 52 of the drip cup 46. This drain outlet 54, also referred to as a drain nipple or nipple outlet, coordinates with and is installed into the drain access port 58 to hold the drip cup 46 to the mounting plate 26 when the drip cup 46 is installed to the mounting plate 26. There are also ridges 60 at the top of the side walls 50 of the drip cup 46 for aligning and coordinating with grooves 62 in the mounting plate 26 for restraining the drip cup 46 to the mounting plate 26.

FIG. 9 illustrates how the drip cup 46 can be installed to the bottom surface of a table and how the drip cup 46 can be detached from the mounting plate 26 while the mounting plate 26 is installed to the table and while the bar gun 1 is stowed in the mounting plate aperture 4.

The above description is illustrative and is not restrictive. A recitation of "a", "an" or "the" is intended to mean "one or more" unless specifically indicated to the contrary. Many variations of the disclosure will become apparent to those skilled in the art upon review of the disclosure. One or more features from any embodiment described herein may be combined with one or more features of any other embodiment without departing from the scope of the disclosure. The scope of the disclosure should, therefore, be determined not with reference to the above description, but instead should be determined with reference to the pending claims along with their full scope or equivalents.

What is claimed is:

1. A holster for a bar gun, the bar gun including a nozzle, a handle and a handle magnet disposed on the handle, the holster comprising:
    a mounting plate having a top side, a bottom side, a first end, and a second end, wherein the top side comprises a connector portion configured to connect the holster to a surface;
    an aperture penetrating the mounting plate from the top side to the bottom side and configured to receive the nozzle of the bar gun, wherein the mounting plate comprises a bend between the first end and the aperture configures so that the second end is angled downwards when the connector portion is connected to the surface; and
    a holster magnet disposed on the mounting plate between the aperture and the second end,
    wherein the holster magnet is configured to be positioned to magnetically couple with the handle magnet when the nozzle of the bar gun is received in the aperture, and
    wherein the holster is configured to restrain the bar gun with both contact between a cylindrical sleeve of the aperture and the nozzle of the bar gun and magnetic coupling of the holster magnet and the handle magnet.

2. The holster of claim 1 wherein the holster magnet is disposed to the bottom side of the mounting plate.

3. The holster of claim 1 wherein the connector portion is configured to mount to the bottom side of a table.

4. The holster of claim 3, further comprising at least one mounting hole located between the aperture and the first end configured for mounting the holster to the table.

5. The holster of claim 4 wherein the aperture sidewall extends from the bottom side of the mounting plate.

6. The holster of claim 5 wherein the magnet retainer is square shaped.

7. The holster of claim 1 further comprising an aperture sidewall extending from the aperture.

8. The holster of claim 1 further comprising a magnet retainer disposed to the mounting plate in which the holster magnet is located.

9. A holster and bar gun assembly comprising:
   a bar gun, comprising;
      a handle having a top and bottom side
      a nozzle configured to be in fluid communication with multiple fluid lines; and
      a handle magnet; and
   a holster, comprising:
      a mounting plate having a top side, a bottom side, a first end and a second end;
      an aperture penetrating the mounting plate from the top side to the bottom side and configured to receive the nozzle of the bar gun, wherein the first end of the mounting plate is configured to mount to an underside of a surface, and wherein the mounting plate further comprises a bend between the first end and the aperture configures so that the second end angles downward when the holster is mounted to an underside of the surface; and
      a holster magnet disposed on the mounting plate between the aperture and the second end,
      wherein when the nozzle of the bar gun is received in the aperture the holster restrains the bar gun with both contact between a cylindrical sleeve of the aperture and the nozzle of the bar gun and magnetic coupling of the holster magnet and the handle magnet.

10. The assembly of claim 9 further comprising a handle magnet retaining plate for fixing the handle magnet to the bar gun handle.

11. The holster of claim 9 wherein the holster magnet is disposed to the bottom side of the mounting plate.

12. The holster of claim 9, further comprising at least one mounting hole located between the aperture and the first end configured for mounting the holster to the underside of the surface.

13. The holster of claim 9 further comprising an aperture sidewall extending from the aperture.

14. The holster of claim 13 wherein the aperture sidewall extends from the bottom side of the mounting plate.

15. The holster of claim 9 further comprising a retainer disposed to the mounting plate in which the holster magnet is located.

16. The holster of claim 15 wherein the magnet retainer is square shaped.

17. A holster for a bar gun, the bar gun including a nozzle, a handle and a handle magnet disposed on the handle, the holster comprising:
   a mounting plate having a top side, a bottom side, a first end, and a second end, wherein the top side comprises a connector portion configured to connect the holster to a surface;
   an aperture penetrating the mounting plate from the top side to the bottom side and configured to receive the nozzle of the bar gun;
   a holster magnet disposed on the mounting plate between the aperture and the second end and positioned to magnetically couple with the handle magnet when the nozzle of the bar gun is received in the aperture; and
   a drip cup detachably connected to the bottom of the mounting plate, the drip cup surrounding the aperture and configured to be detachable from the mounting plate when the mounting plate is installed to the surface and the nozzle of the bar gun is received in the holster.

18. The holster of claim 17 wherein the holster magnet is fixed to the bottom side of the mounting plate.

19. The holster of claim 17, wherein the drip cup comprises a bottom, two side walls and front wall and a back wall and a drain outlet penetrating the back wall.

20. The holster of claim 19, wherein the drip cup further comprises a drain nipple extending outward from the drain outlet.

21. The holster of claim 20 wherein the first end of the mounting plate is configured to mount to the bottom side of a table.

22. The holster of claim 19, further comprising at least one mounting hole located between the aperture and the first end configured for mounting the holster to the surface.

23. The holster of claim 17, wherein the mounting plate further comprises a downward extending wall having a drain port.

24. The holster of claim 17, wherein the drain nipple is configured to coordinate with the drain port of the mounting plate to align and restrain the drip cup to the mounting plate.

* * * * *